(12) United States Patent
Harada

(10) Patent No.: US 10,795,622 B2
(45) Date of Patent: Oct. 6, 2020

(54) INFORMATION PROCESSING APPARATUS, PRINTING METHOD, AND COMPUTER-READABLE MEDIUM

(71) Applicant: Kohtaroh Harada, Kanagawa (JP)

(72) Inventor: Kohtaroh Harada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/297,209

(22) Filed: Mar. 8, 2019

(65) Prior Publication Data

US 2019/0286392 A1    Sep. 19, 2019

(30) Foreign Application Priority Data

Mar. 14, 2018  (JP) .................... 2018-047337
Oct. 19, 2018  (JP) .................... 2018-197928

(51) Int. Cl.
*G06F 3/12* (2006.01)
*G06F 21/31* (2013.01)

(52) U.S. Cl.
CPC .......... *G06F 3/1238* (2013.01); *G06F 3/1254* (2013.01); *G06F 3/1286* (2013.01); *G06F 21/31* (2013.01)

(58) Field of Classification Search
CPC .... G06F 3/1238; G06F 3/1253; G06F 3/1255; G06F 3/1258; G06F 3/1257; G06F 3/1254; G06F 3/1286
See application file for complete search history.

(56) References Cited

U.S. PATENT DOCUMENTS

2013/0308156 A1*  11/2013  Kakutani ........... G06K 15/4095
                                                      358/1.14

FOREIGN PATENT DOCUMENTS

JP    2012-014345    1/2012
JP    2015-111376    6/2015

* cited by examiner

*Primary Examiner* — Moustapha Diaby
(74) *Attorney, Agent, or Firm* — Oblon, McClelland, Maier & Neustadt, L.L.P.

(57) ABSTRACT

An information processing apparatus includes circuitry configured to perform: first allowing a setting value for a print setting to be specified; second allowing a setting value for a print setting to be specified; specifying a setting value for a print setting through any one of the first allowing or the second allowing; generating print data; determining whether the setting value for the print setting is specified through the first allowing or the second allowing; writing the print setting and the setting value specified through one of the first allowing and the second allowing in print setting information storage in an associated manner; reading the setting value associated with the print setting from the print setting information storage; and transmitting the print data to which a print command corresponding to the print setting including the setting value is added, to an apparatus connected via a network.

9 Claims, 15 Drawing Sheets

FIG.11

```
argv[0]="_10_60_135_145"
argv[1]="134"
argv[2]="login_user"
argv[3]="UNTITLED"
argv[4]="1"
argv[5]="AP_ColorMatchingMode=AP_ApplicationColorMatching AP_D_InputSlot= noBookletBinding..b.
BookletType..n..=0 collate com.apple.print.DocumentTicket.PMSpoolFormat=application/pdf
com.apple.print.JobInfo.PMApplicationName=TEXT EDIT
com.apple.print.JobInfo.PMJobName=UNTITLED com.apple.print.JobInfo.PMJobOwner=login_user (
SNIP) com.ricoh.printsettings.11AUserID=userid (SNIP)"
```

FIG.12

```
*PPD-Adobe: "4.3"
*RIUserIDString: userid
*cupsLanguages: "ja"
*%
*%  Printer Description file
*%    for "RICOH MP C3003 JPN PS"
*%
*%    CreationDate: 2012/02/10
*%    Modified:    2013/10/07
*%
*%    COPYRIGHT (C) 2012-20133 RICOH COMPANY, LTD.
*%    All rights reserved.
*%
*FileVersion: "2.0"
*FormatVersion: "4.3"
*LanguageEncoding: ISOLatin1
*LanguageVersion: English
*ModelName: "RICOH MP C3003 JPN"
*PCFileName: "RI3371D3.PPD"
*Manufacturer: "RICOH"
*Product: "(RICOH MP C3003 JPN PS3)"
*PSVersion: "(3018.102) 2"
*ShortNickName: "RICOH MP C3003 JPN PS"
*NickName: "RICOH MP C3003 JPN PS"
```

INFORMATION PROCESSING APPARATUS, PRINTING METHOD, AND COMPUTER-READABLE MEDIUM

CROSS-REFERENCE TO RELATED APPLICATIONS

The present application claims priority under 35 U.S.C. § 119 to Japanese Patent Application No. 2018-47337, filed on Mar. 14, 2018 and Japanese Patent Application No. 2018-197928 filed in Japan on Oct. 19, 2018. The contents of which are incorporated herein by reference in their entirety.

BACKGROUND OF THE INVENTION

1. Field of the Invention

The present invention relates to an information processing apparatus, a printing method, and a computer-readable medium.

2. Description of the Related Art

A technology capable of setting user IDs and passwords in an image forming apparatus, such as a printer, to manage, for example, printing performed by different departments has been known.

An apparatus that causes a printer driver to read a user ID and a password stored in a printer description file and save time and effort to re-enter the user ID and the password when performing printing using the above-described image forming apparatus has also been known (Japanese Unexamined Patent Application Publication No. 2015-111376).

However, in the technique described in Japanese Unexamined Patent Application Publication No. 2015-111376, when printing is performed via an application that does not use a printer driver, it is impossible to read the user ID and the password and authenticate a user. In this manner, in the conventional techniques, when printing is performed via an application that does not use a printer driver, it is impossible to use print settings etc., such as a user ID and a password, which are available when the printer driver is used.

SUMMARY OF THE INVENTION

According to one aspect of the present invention, an information processing apparatus is configured to perform communication with an apparatus connected via a network. The information processing apparatus includes a print setting information storage and circuitry. The print setting information storage is configured to store a print setting and a setting value in an associated manner. The circuitry is configured to perform: first allowing a setting value for a print setting to be specified; second allowing a setting value for a print setting to be specified; specifying a setting value for a print setting through any one of the first allowing or the second allowing; generating print data; determining whether the setting value for the print setting is specified through the first allowing or the second allowing; writing the print setting and the setting value specified through one of the first allowing and the second allowing in the print setting information storage in an associated manner; reading the setting value associated with the print setting from the print setting information storage; and transmitting the print data to which a print command corresponding to the print setting including the setting value is added, to the apparatus.

BRIEF DESCRIPTION OF THE DRAWINGS

FIG. 11 is a diagram illustrating a concrete example of print settings according to the embodiment;

FIG. 12 is a diagram illustrating a concrete example of print settings of a PostScript printer description (PPD) according to the embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
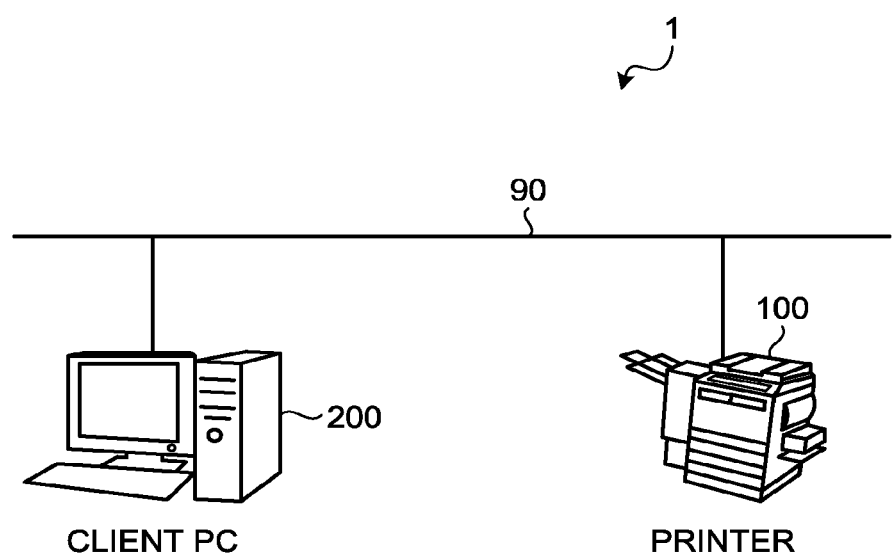
FIG. 1 is a diagram illustrating an example of a configuration of a system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an information processing apparatus, a printing method, and a computer-readable medium capable of using the same print settings as in the case of using a printer driver, even when printing is performed via an application that does not use the printer driver.

Exemplary embodiments of an information processing apparatus, a printing method, and a computer-readable medium according to the present invention will be described in detail below with reference to FIG. 1 to FIG. 17. The present invention is not limited by the embodiments below, and components in the embodiments described below include one that can easily be thought of by a person skilled in the art, one that is practically identical, and one that is within an equivalent range. Further, within the scope not departing from the gist of the following embodiments, various omission, replacement, modifications, and combinations of the components may be made.

Overall Configuration of System

FIG. 1 is a diagram illustrating an example of a configuration of a system 1 according to an embodiment. A client personal computer (PC) 200 as an information processing apparatus included in the system 1 according to the embodiment is the client PC 200 that performs communication with a printer 100 that is an apparatus connected thereto via a network, and includes a print dialog 240 serving as a setting specifying unit for allowing a setting value for a print setting to be specified, a print queue storage unit 212 serving as a print setting information storage unit that stores therein the print setting and the setting value in an associated manner, applications 250a and 250b serving as data generating units that generate print data, a user interface (UI) setting determining unit D2 serving as a determining unit that determines whether the setting value is set for the print setting, a PPD writing unit D1 serving as a writing unit that writes the print setting and the setting value in the print queue storage unit 212 in an associated manner, a PPD reading unit D3 serving as a reading unit that reads the setting value associated with the print setting from the print queue storage unit 212, and a communication executing unit 216 serving as a transmitting unit that transmits print data, to which a print command corresponding to the print setting including the setting value is added, to the apparatus. The system 1 of the embodiment will be described in detail below.

As illustrated in FIG. 1, the system 1 of the embodiment includes the client PC 200 and the printer 100. The client PC 200 and the printer 100 are connected to each other via a network 90. The network 90 is, for example, an internal computer network, such as an internal local area network (LAN), used in a business office or the like.

The printer 100 as an apparatus (more specifically, an image forming apparatus) has, for example, a printing function. The client PC 200 as an information processing apparatus transmits print data, such as image data, and print settings to the printer 100 via the network 90 and causes the printer 100 to perform printing. In the example in FIG. 1, the single client PC 200 and the single printer 100 are illustrated, but embodiments are not limited to this example, and it is possible to provide arbitrary numbers of the client PCs 200 and the printers 100.

Hardware Configuration of Printer

Figure 2:
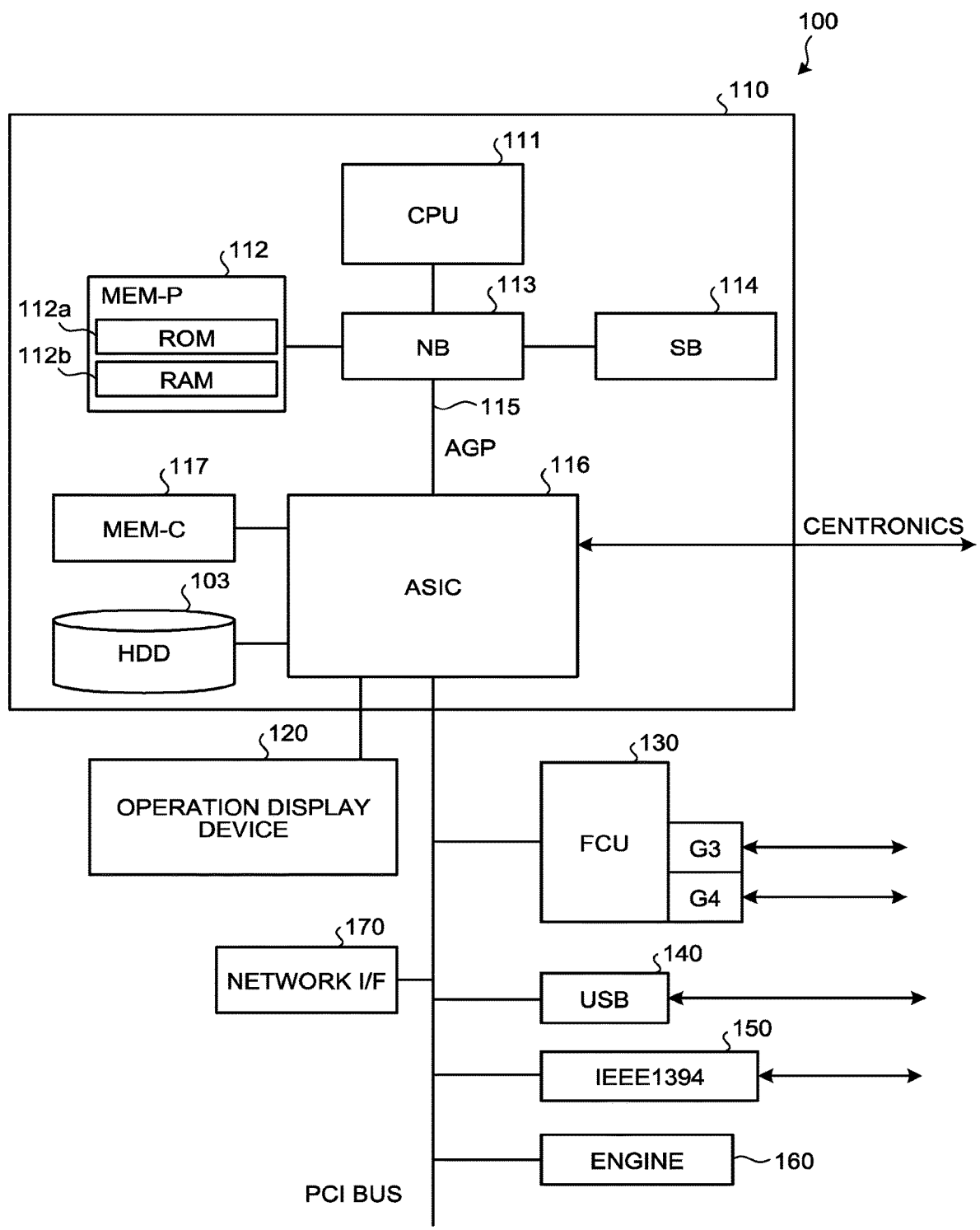
FIG. 2 is a block diagram illustrating a hardware configuration of a printer according to the embodiment.

FIG. 2 is a block diagram illustrating a hardware configuration of the printer 100 according to the embodiment. As illustrated in FIG. 2, the printer 100 includes a controller 110 and an engine unit 160 that are connected to each other via a peripheral component interface (PCI) bus.

The engine unit 160 is a printer engine that is connectable to the PCI bus, and includes, for example, a black and white plotter, a 1-drum color plotter, and a 4-drum color plotter. Meanwhile, the engine unit 160 includes an image processing part for performing error diffusion, gamma correction, and the like, in addition to what is called an engine part, such as a plotter.

The controller 110 controls the entire printer 100, drawing, communication, and input from an operation display device 120 included in the printer 100. Specifically, the controller 110 includes a central processing unit (CPU) 111, a north bridge (NB) 113, a system memory (MEM-P) 112, a south bridge (SB) 114, a local memory (MEM-C) 117, an application specific integrated circuit (ASIC) 116, and a hard disk drive (HDD) 103.

The CPU 111 controls the entire printer 100. The CPU 111 is connected to other apparatuses via a chipset that includes the NB 113, the MEM-P 112, and the SB 114. The NB 113 and the ASIC 116 are connected to each other via an accelerated graphics port (AGP) bus 115. The ASIC 116 may be directly connected to the client PC 200 via a Centronics cable, for example.

The NB 113 is a bridge for connecting the CPU 111 to the MEM-P 112, the SB 114, and the AGP bus 115. The NB 113 includes a memory controller for controlling read and write with respect to the MEM-P 112, and includes a PCI master and an AGP target.

The SB 114 is a bridge for connecting the NB 113 to a PCI device and a peripheral device. The NB 113 is connected to the SB 114 via the PCI bus. A network interface (I/F) 170 and the like that perform communication with the client PC 200 are also connected to the PCI bus.

The MEM-P 112 is a system memory used as a memory for storing programs and data, a memory for loading programs and data, a drawing memory for the printer 100, and the like. The MEM-P 112 includes a read only memory (ROM) 112a and a random access memory (RAM) 112b.

The ROM 112a is a read only memory used as a memory for storing programs and data. The RAM 112b is a writable and readable memory used as a memory for loading programs and data, a drawing memory for the printer 100, and the like.

The ASIC 116 is an integrated circuit (IC) that includes hardware components for image processing and is used for image processing. The ASIC 116 serves as a bridge for connecting the AGP bus 115, the PCI bus, the HDD 103, and the MEM-C 117 to one another. The ASIC 116 includes a PCI target, an AGP master, an arbiter (ARB) that is a central core of the ASIC 116, a memory controller for controlling the MEM-C 117, a plurality of direct memory access controllers (DMACs), and a PCI unit. The DMACs perform rotation of image data or the like using hardware logic. The PCI unit transfers data to and from the engine unit 160 via the PCI bus.

A facsimile control unit (FCU) 130, a universal serial bus (USB) 140, and an Institute of Electrical and Electronics Engineers 1394 (IEEE1394) interface 150 are connected to the ASIC 116 via the PCI bus. The operation display device 120 is directly connected to the ASIC 116.

The MEM-C 117 is used as a copy image buffer and a code buffer.

The HDD 103 is a storage for storing image data, programs, font data, and forms. The HDD 103 stores therein a license file of an application that is executed by the printer 100.

The AGP bus 115 is a bus interface for a graphics accelerator card that is introduced to accelerate graphics operation. The AGP bus 115 allows direct access to the MEM-P 112 at high throughput to thereby accelerate operation of the graphics accelerator card.

Hardware Configuration of Client PC

Figure 3:
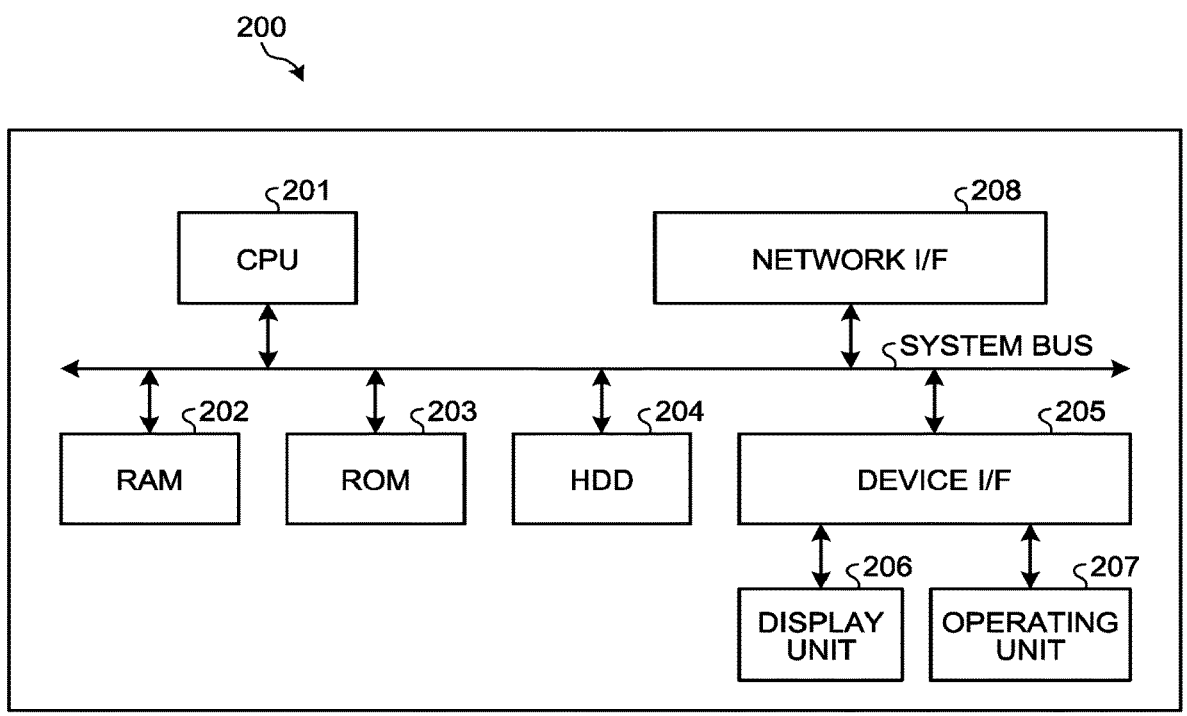
FIG. 3 is a diagram illustrating an example of a hardware configuration of a client personal computer (PC) according to the embodiment.

FIG. 3 is a diagram illustrating an example of a hardware configuration of the client PC 200 according to the embodiment. As illustrated in FIG. 3, the client PC 200 includes a CPU 201, a RAM 202, a ROM 203, an HDD 204, a device I/F 205, and a network I/F 208, all of which are connected to one another via a system bus. A display unit 206 and an operating unit 207 are connected to the device I/F 205.

The CPU 201 is an arithmetic means and integrally controls entire operation of the client PC 200. The RAM 202 is a volatile storage medium, with respect to which information is readable and writable at a high speed, and used as a working area when the CPU 201 processes information. The ROM 203 is a read-only non-volatile storage medium and stores therein programs of firmware and the like.

The HDD 204 is a non-volatile storage medium, with respect to which information is readable and writable, and stores therein an operating system (OS), various control programs, various application programs, and the like. The HDD 204 stores therein files, data, and the like that are needed to implement various functions of the client PC 200.

The device I/F 205 is an interface for connecting each of the display unit 206 and the operating unit 207 to the system bus. The display unit 206 is a visual user interface for displaying various kinds of information, and is configured using, for example, a liquid crystal display (LCD) or the like. The operating unit 207 is a user interface, such as a keyboard or a mouse, which allows a user to input various kinds of information to the client PC 200.

The network I/F 208 is an interface for connecting the client PC 200 to the network 90.

In the hardware configuration as described above, by causing the CPU 201 to perform calculations in accordance with a program stored in the ROM 203 or a program that is loaded on the RAM 202 from a storage medium, such as the HDD 204 or an optical disk (not illustrated), software control units are constructed. By a combination of the software control units constructed as above and hardware, functional blocks that implement the functions of the client PC 200 are constructed.

Meanwhile, a program for the client PC 200 may be distributed by being recorded in a computer readable recording medium, such as a recording media, in a computer-installable or computer-executable file format.

Functional Configuration of Client PC

Figure 4:
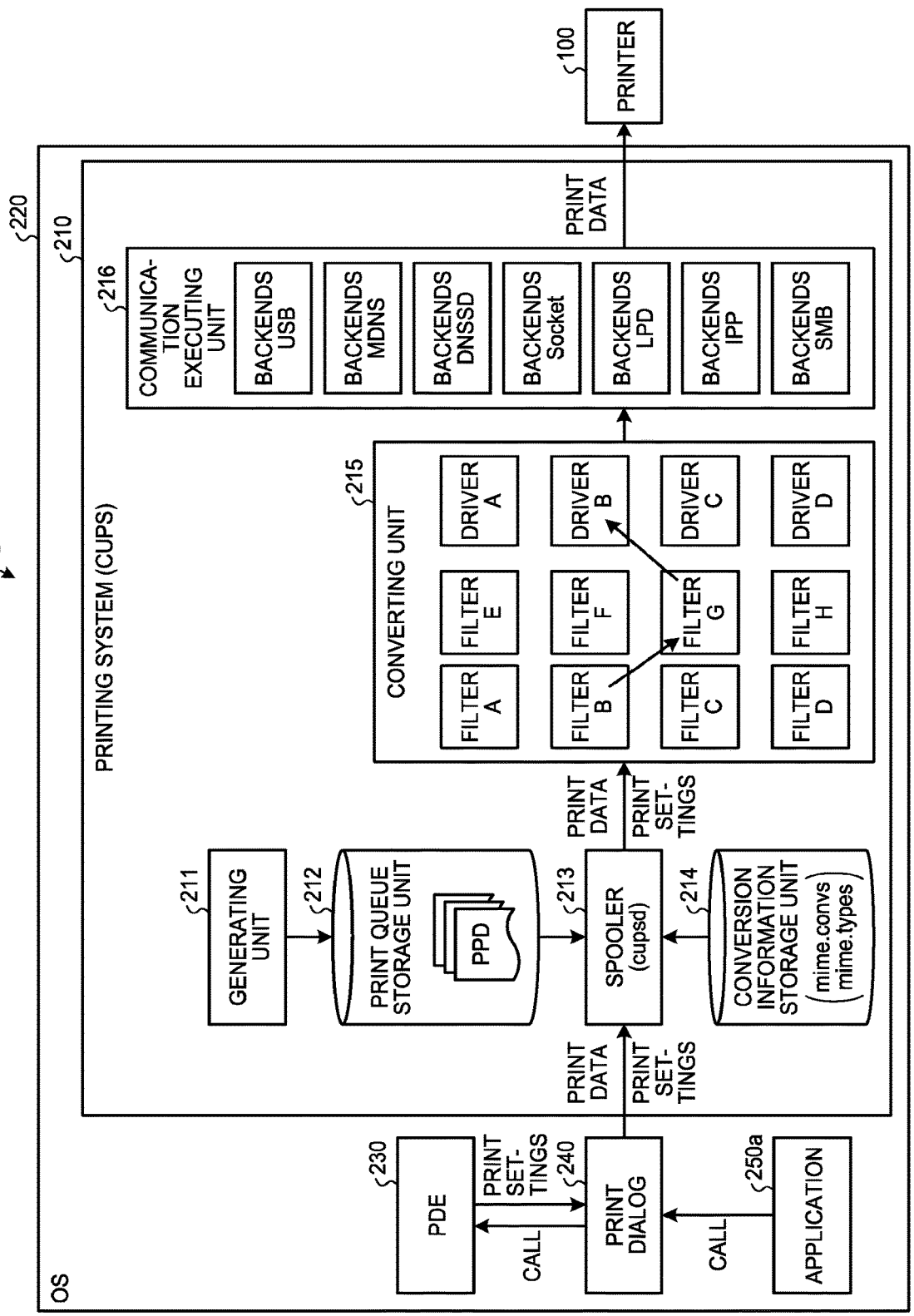
FIG. 4 is a diagram illustrating an example of a functional configuration and operation of the client PC according to the embodiment.

FIG. 4 is a diagram illustrating an example of a functional configuration and operation of the client PC 200 according to the embodiment. As illustrated in FIG. 4, the client PC 200 includes, on an OS 220, a print dialog extension (PDE) 230, the print dialog 240, the application 250a, the application 250b to be described later, a printing system (Common Unix (registered trademark) printing system (CUPS)) 210.

The printing system 210 includes a generating unit 211, the print queue storage unit (Config Files) 212, a spooler (cupsd) 213, a conversion information storage unit (mime.convs and mime.types) 214, a converting unit 215, and the communication executing unit 216.

The generating unit 211 is one mode of Autosetup Tool, and is a program for rewriting the print queue storage unit 212 to generate a print queue. For example, the generating unit 211 checks an IP address of the printer 100 serving as a connection destination when generating a print queue, and stores correspondence information, in which the IP address is associated with the print queue, in the print queue storage unit 212. Meanwhile, when a print protocol, such as USB or Bluetooth (registered trademark), other than the Internet protocol is used, the generating unit 211 stores correspondence information, which indicates that the IP address is not present for the print queue, in the print queue storage unit 212. The Autosetup Tool is generally developed and provided by a printer vendor.

The print queue storage unit 212 serving as the print setting information storage unit stores therein, for example, the printing system 210 and printer settings including a print protocol to be used and an address of a connection destination on the protocol. Further, the print queue storage unit 212 holds a printer description file (PostScript Printer Description (PPD)), in which information is recorded for each type of a PostScript (registered trademark) printer. The PPD is referred to by a driver of the PostScript printer at the time of printing.

The spooler 213 is one mode of cupsd. The spooler 213 generates, with reference to the conversion information storage unit 214, a filter pipeline with low processing costs in order to convert, at the time of performing printing, a format of the print data received from the application 250a to a format of print data to be output to the printer 100 that is written in the print queue storage unit 212, and feeds print data to the filter pipeline. To "generate the filter pipeline" is to sequentially arrange filters (for example, filters and drivers of the converting unit 215 and backends of the communication executing unit 216) to which print data is to be fed. The filter includes a driver and a backends. Meanwhile, a weighting value as information on the processing costs is assigned to each of the filters by comprehensively evaluating items, such as a processing load, low degradation of image quality, or high processing efficiency, and, by arranging the filters in such order that weighting values are minimized, it is possible to generate a filter pipeline with low processing costs.

The conversion information storage unit 214 is one mode of mime.convs and mime.types, and is held, from the beginning, in the printing system 210 as information for generating a filter pipeline. An input data format, an output data format, information on processing costs, and the like are stored for each of the filters included in the printing system 210. For example, in the case of Mac OS X (registered trademark), "/usr/share/cups/mime/apple.convs" and "/usr/share/cups/mime/mime.convs" correspond to this. In mime.types, a rule for distinguishing file types of print data is defined. For example, in the case of Mac OS X (registered trademark), "/usr/share/cups/mime/apple.types" and "/usr/share/cups/mime/mime.types2" correspond to this.

The converting unit 215 includes filters A to H and drivers a to d. The filters convert print data formats. The printing system 210 includes, from the beginning, various filters to deal with various input formats and various output formats. For example, a filter for converting PDF data to PostScript data, a filter for converting PDF data to Raster data, a filter for converting Raster data to tiff data, and the like are included. For example, in the case of Mac OS X (registered trademark), filters included in the printing system 210 from the beginning are stored in "/usr/libexec/cups/filter/".

The drivers are filters that are generally provided by a printer vendor, and used for performing conversion to a print data format unique to the printer vendor and adding a print command unique to the printer vendor to print data after data conversion using a filter is completed. A print queue defines a driver to be used for printing.

The communication executing unit 216 serving as the transmitting unit includes a plurality of backends. In the example illustrated in FIG. 4, the communication executing unit 216 includes a backends USB to a backends SMB. Each of the backends included in the communication executing unit 216 has a communication module function for performing communication with the printer 100. Each of the backends included in the communication executing unit 216 is an independent executable file. Further, each of the backends included in the communication executing unit 216 is associated with a communication protocol. In other words, a single backends is present for a single corresponding communication protocol.

The application 250*a* serving as the data generating unit is a general application that is used by being installed in the OS 220. The application 250*a* performs printing using a printer driver, unlike the application 250*b* to be described later.

The print dialog 240 serving as a first setting specifying unit or serving to perform first allowing a setting value for a print setting to be specified is provided by the OS 220. The print dialog 240 provides a user interface for allowing a user to select a printer function that the user wants to use, such as input of setting values in various print setting items (for example, duplex printing and the like) that are print settings. As the user interface, contents described in the PPD are basically displayed by the OS 220.

The PDE 230 is a plug-in module provided by a printer vendor, and is a module for providing a user interface unique to the printer vendor. When a richer user interface is to be provided, the PDE 230 is displayed as a part of the print dialog 240 (serving as a second setting specifying unit or serving to performing second allowing a setting value for a print setting to be specified) by extending the print dialog 240 using a plug-in. It is possible to extend settings of the PPD using the PDE 230. For example, as one example, user authentication using a user ID and a password may be extended. The user authentication may be extended in order to prevent information leakage and manage printing performed by different departments, for example.

Here, with reference to FIG. 5 to FIG. 7, an example of control of the application 250*a*, the print dialog 240, and the PDE 230 by the control unit will be described by using "Library Validation" as one example. "Library Validation" is a system that is provided by mac OS to enhance security, and is enabled when an application creator provides an application with an electronic signature.

Figure 5:
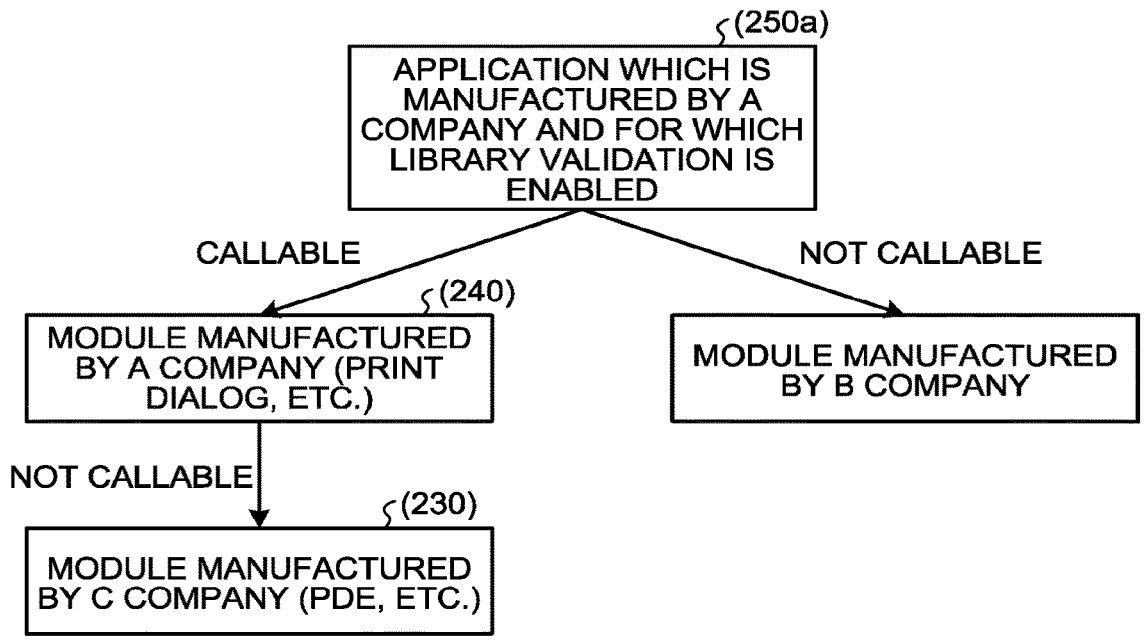
FIG. 5 is a diagram for explaining the basis of "Library Validation"

FIG. 5 is a diagram for explaining the basis of "Library Validation". As illustrated in FIG. 5, when "Library Validation" is enabled with respect to the application 250*a*, the application 250*a* is only allowed to activate modules with the same signature or modules manufactured by Apple Inc. In the example illustrated in FIG. 5, the application 250*a*, which is manufactured by an A company and for which "Library Validation" is enabled, is able to call a module that is manufactured by Apple Inc., such as the print dialog 240, but is not able to call a module that is manufactured by a B company and that is not provided with the signature of the A company. Further, the module that is manufactured by the A company and called by the application, which is manufactured by the A company and for which "Library Validation" is enabled, is not able to call a module (for example, the PDE 230 or the like) that is manufactured by a C company and that is not provided with the signature of the A company. In other words, the application 250*a* for which "Library Validation" is enabled is not able to display a user interface (UI) that is extended by the PDE 230. Display control of print settings in the print dialog 240 in each of a case where "Library Validation" is enabled and a case where "Library Validation" is disabled will be described below.

Figure 6:
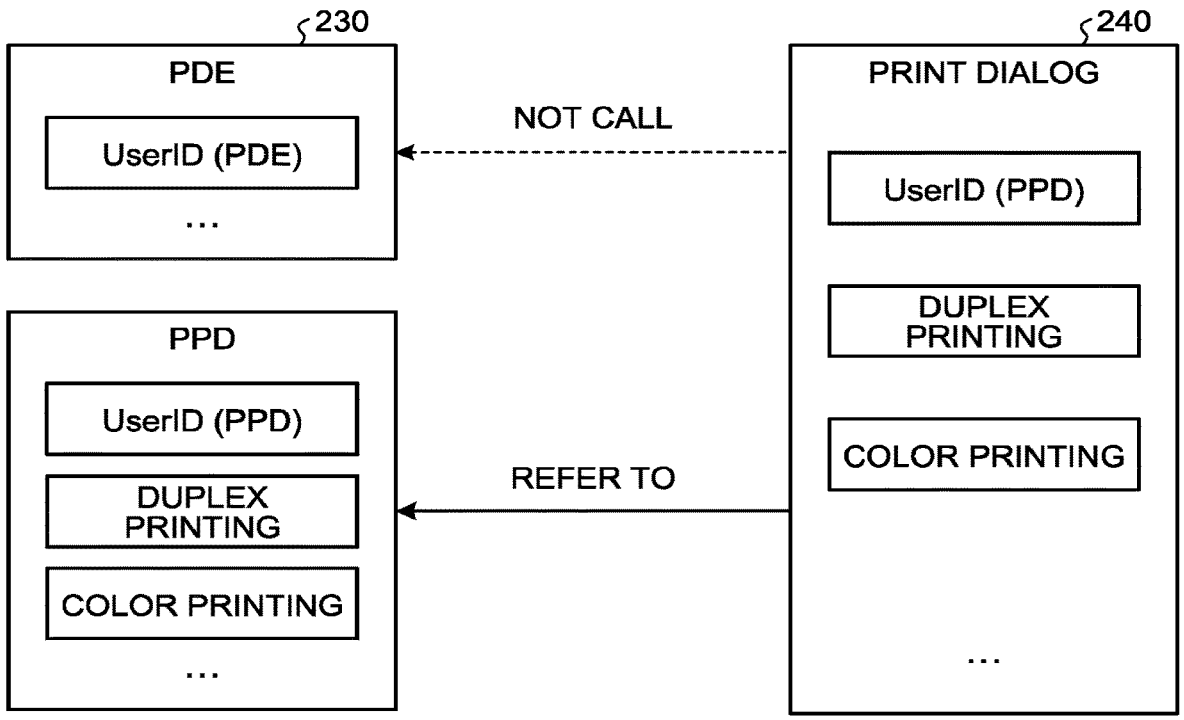
FIG. 6 is a diagram illustrating an example of print settings that are displayed in a print dialog when "Library Validation" is enabled.

FIG. 6 is a diagram illustrating an example of print settings that are displayed in the print dialog 240 when "Library Validation" is enabled. The print dialog 240 refers to the PPD regardless of the setting of "Library Validation", and displays print setting items, such as a user ID (PPD), duplex printing, and color printing, which are print settings of the PPD. Further, the print dialog 240 is not able to download the PDE 230 because "Library Validation" is enabled, and therefore, the print dialog 240 displays only print setting items that are provided by the PPD. For example, the UserID (PPD) provided by the PPD is displayed as a UserID.

Figure 7:
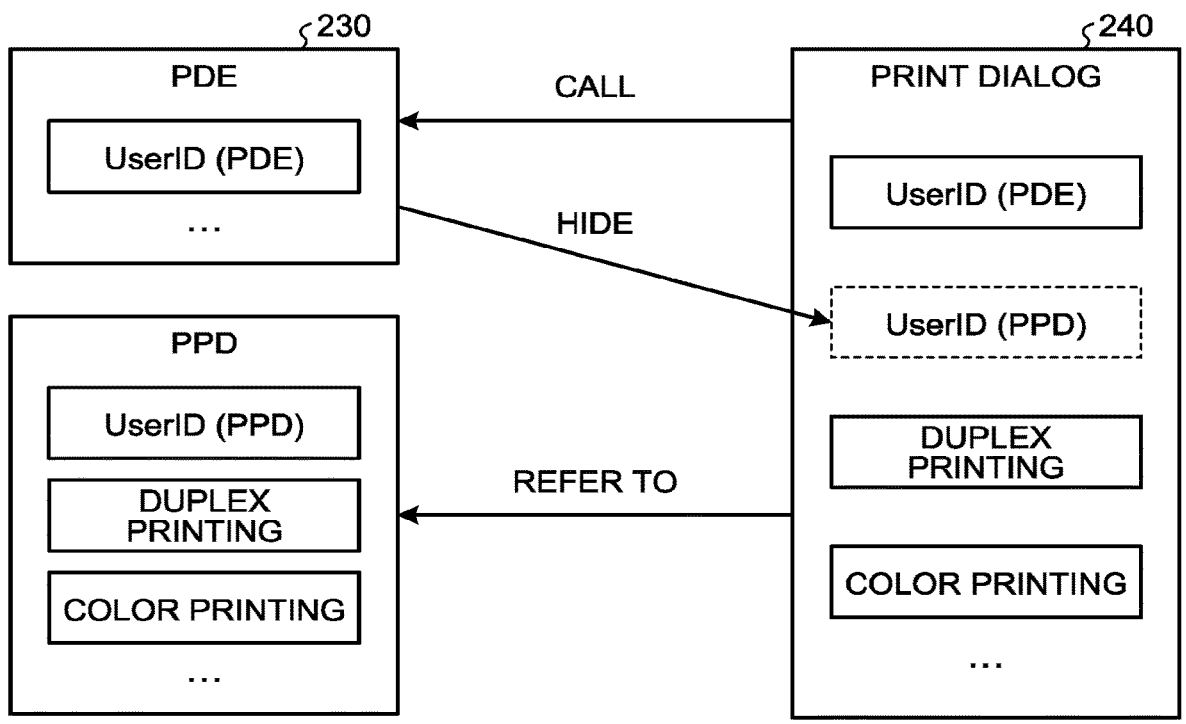
FIG. 7 is a diagram illustrating an example of print settings that are displayed in the print dialog when "Library Validation" is disabled.

FIG. 7 is a diagram illustrating an example of print settings that are displayed by the print dialog 240 when "Library Validation" is disabled. The print dialog 240 refers to the PPD regardless of the setting of "Library Validation", and displays print settings in the print dialog 240 in the same manner as in the case where "Library Validation" is enabled. Further, in this case, the print dialog 240 loads the PDE 230 because "Library Validation" is disabled. Therefore, the print dialog 240 is able to further display the print settings of the PDE 230. Meanwhile, two settings that are provided by the PPD and the PDE 230 will be displayed with respect to the same print setting item if they are handled without any change, and therefore, the PDE 230 hides the value that is provided by the PPD with respect to the same print setting item in the print dialog 240. For example, as illustrated in FIG. 7, because two settings, such as a UserID (PDE) provided by the PDE 230 and the UserID (PPD) provided by the PPD, will be displayed as the UserID, the PDE 230 hides the UserID (PPD) in the print dialog 240. As a result, only the user ID provided by the PDE 230 is displayed as the UserID.

A configuration example of the drivers included in the converting unit 215 will be described below with reference to FIG. 8.

Figure 8:
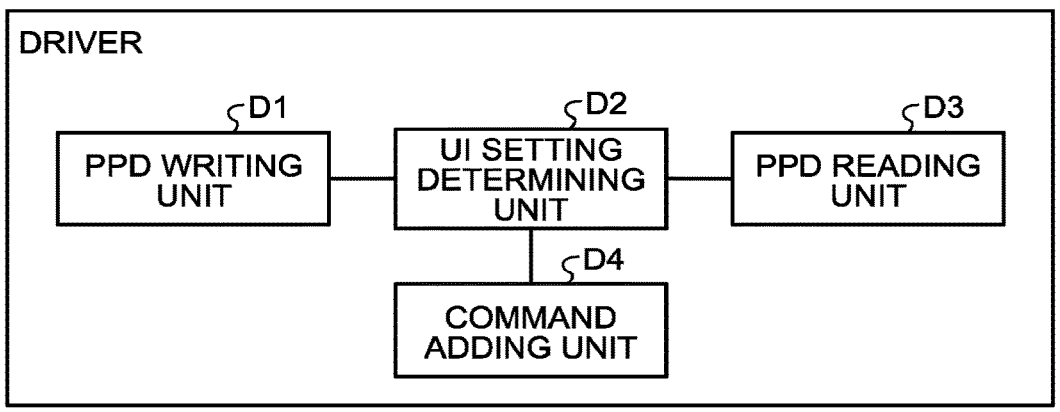
FIG. 8 is a diagram illustrating an example of a functional configuration of a driver according to the embodiment.

FIG. 8 is a diagram illustrating an example of a functional configuration of the drivers according to the embodiment. As illustrated in FIG. 8, each of the drivers a to d includes the PPD writing unit D1, the UI setting determining unit D2, the PPD reading unit D3, and a command adding unit D4.

The UI setting determining unit D2 serving as the determining unit determines whether setting values are specified for print settings (print setting items) by the PDE 230 and the print dialog 240 provided by the OS 220, for each of the print settings (print setting items), such as a user ID, a password, duplex printing, and a sheet size.

If the setting values are specified, the UI setting determining unit D2 instructs the PPD writing unit D1 to write the print settings in the PPD. The PPD writing unit D1 serving as the writing unit stores the print settings in the PPD.

If the setting values are not specified, the UI setting determining unit D2 instructs the PPD reading unit D3 to read the print settings from the PPD. The PPD reading unit D3 serving as the reading unit reads the print settings from the PPD, and reflects the read print settings in current print settings, that is, in print settings used for current printing.

If processes on all of the print settings (print setting items) are completed, the UI setting determining unit D2 instructs the command adding unit D4 to add print commands corresponding to the print settings (print setting items). The command adding unit D4 serving as an adding unit adds print commands corresponding to the print settings (print setting items) to the print data, and sends the print data to the backends of the communication executing unit 216.

Operation in Which Printer Driver of Client PC is Used

Figure 9:
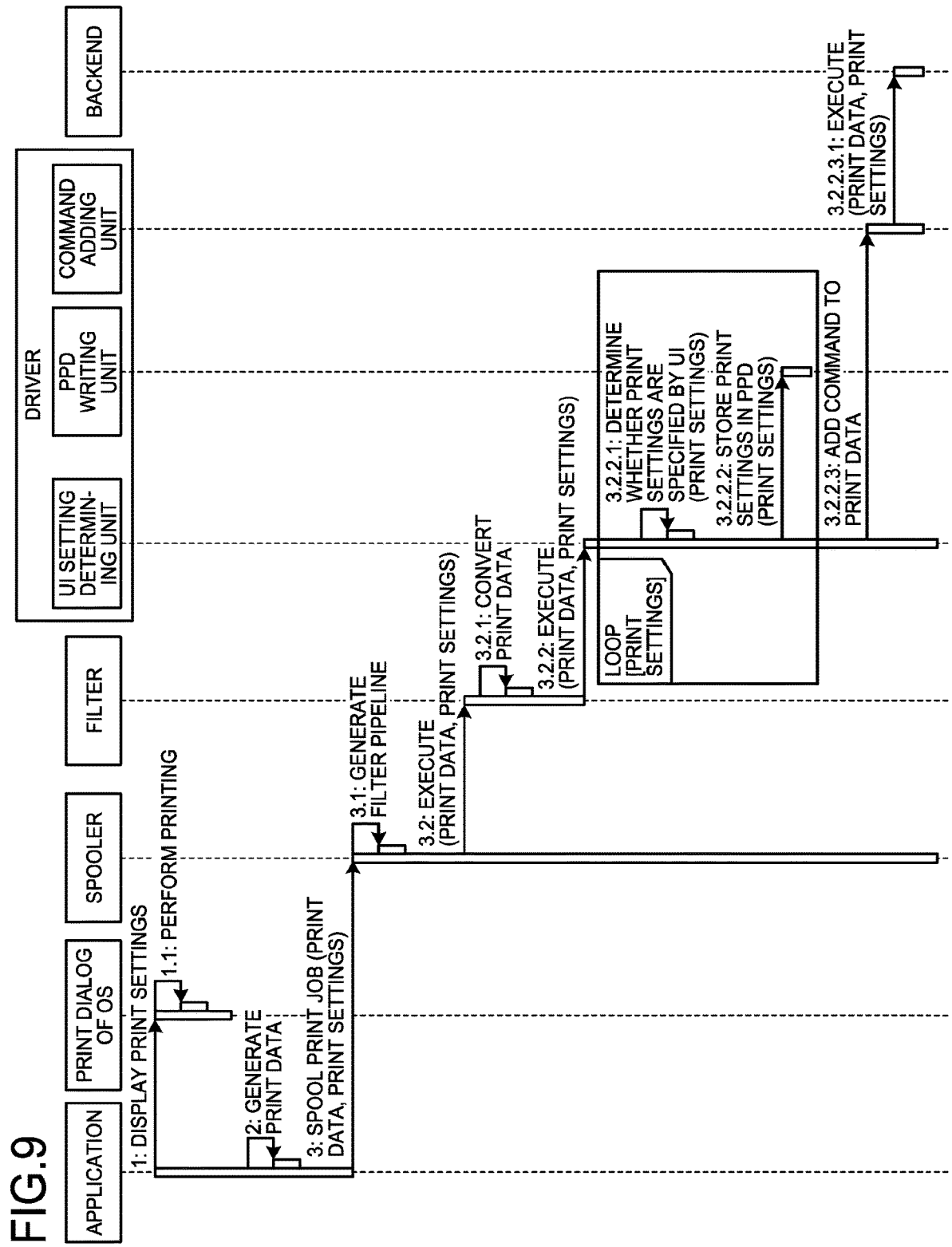
FIG. 9 is a sequence diagram illustrating an example of print operation in which a printer driver of the client PC according to the embodiment is used.

Operation in which a printer driver of the client PC 200 of the embodiment is used will be described below with reference to FIG. 4 and FIG. 9. FIG. 9 is a sequence diagram illustrating an example of print operation in which the printer driver of the client PC 200 according to the embodiment is used.

When the general application 250a as illustrated in FIG. 4 performs printing, the print dialog 240 and the PDE 230 are sequentially called (1 to 1.1 in FIG. 9). Meanwhile, when "Library Validation" described above as an example is enabled, the PDE 230 is not called. The PDE 230 returns setting values including a user ID, a password, and the like set by the user interface to the print dialog 240. The application 250a generates print data (2 in FIG. 9). The print settings and the print data are sent to the spooler 213 (3 in FIG. 9).

The spooler 213 generates a filter pipeline (3.1 to 3.2 in FIG. 9). A file format of the print data is converted using a filter of the converting unit 215 (3.2.1 to 3.2.2 in FIG. 9). Further, a driver converts the print data to a unique print data format.

The UI setting determining unit D2 of the driver determines whether the print settings, such as the user ID and the password, are specified by the user interface (3.2.2.1 in FIG. 9). More specifically, the UI setting determining unit D2 determines whether the print settings are specified for the print setting items of the print dialog 240 or the PDE 230. This determination process will be described later with reference to FIG. 10. The application 250a that performs printing using the printer driver has print settings including setting values of the user ID, the password, and the like that are set by the user interface (see FIG. 11 and FIG. 12), and therefore, the PPD writing unit D1 stores the print settings (the setting values of the print setting items) in the PPD (3.2.2.2 in FIG. 9). The command adding unit D4 adds a command to the print data (3.2.2.3 in FIG. 9). The driver repeats the sequence for all of the print settings (print setting items).

Thereafter, the print data is transmitted to and printed by the printer 100 by the backends included in the communication executing unit 216 (3.2.2.3.1 in FIG. 9).

Figure 10:
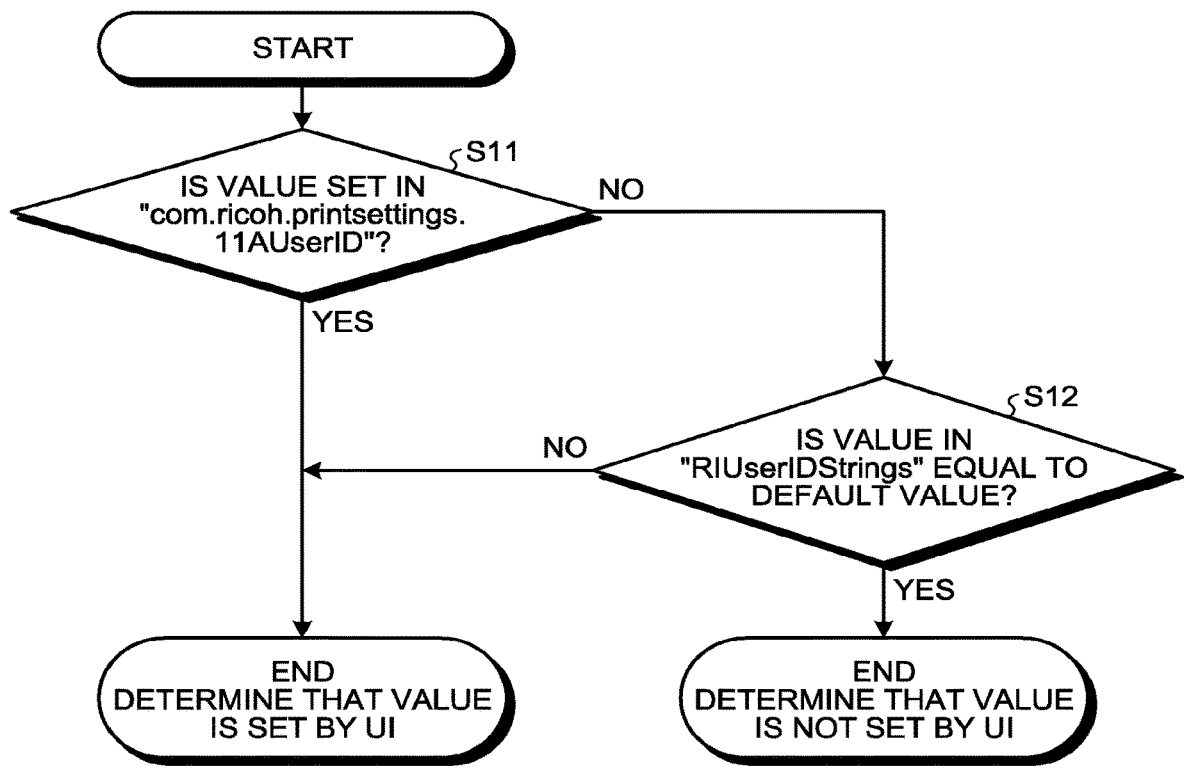
FIG. 10 is a diagram illustrating an example of the flow of a determination process performed by an UI setting determining unit.

FIG. 10 is a diagram illustrating an example of the flow of the determination process performed by the UI setting determining unit D2. The UI setting determining unit D2 determines whether the print settings are specified by the UI (the PDE 230) provided by the PDE 230 in the following manner.

First, at Step S11, the UI setting determining unit D2 examines received parameters, and determines whether a value is set in "com.ricoh.printsettings.11AUserID" (see FIG. 11). If a value is set in "com.ricoh.printsettings.11AUserID" (Yes), the UI setting determining unit D2 determines that the value is set by the UI (the PDE 230), and terminates the determination process.

If a value is not set in "com.ricoh.printsettings.11AUserID" (No), a value is not set by the PDE 230. Therefore, at Step S12, the UI setting determining unit D2 checks a value in "RIUserIDStrings" (see FIG. 12) and determines whether the value is set by the UI (PPD) that is provided by the PPD. Meanwhile, while the value specified by the PPD is set in "RIUserIDStrings", it is impossible to leave a default value blank due to the behavior of the PPD with respect to control of inputting a character string, such as a user ID. Therefore, "None" or the like is set as the default value. In other words, even when a user does not specify a user ID by the UI, the value in "RIUserIDStrings" is not left blank but indicates the default value. Therefore, if the value of "RIUserIDStrings" is not equal to the default value (No), the UI setting determining unit D2 determines that the value is set by the UI (PPD), and terminates the determination process. Further, if the value of "RIUserID" is equal to the default value (Yes), the UI setting determining unit D2 determines that the value is not set by the UI (PPD), and terminates the determination process.

A concrete example of print settings that are sent by the spooler 213 to the filters, the drivers, and the backends is illustrated in FIG. 11. FIG. 11 is a diagram illustrating a concrete example of the print settings according to the embodiment. The filters, the drivers, and the backends receive, from the spooler 213, values as illustrated in FIG. 11 as parameters of command lines.

N in "argv[N]" corresponds to an n-th parameter. In "argv[5]" that is a fifth parameter, all of print settings specified by the user interface are listed. The last line, i.e., "com.ricoh.printsettings.11AUserID=userid" indicates that a value of "userid" is set with respect to a keyword of "11AUserID" that is defined by Ricoh Company, Ltd. as a printer vendor. "com.ricoh.printsettings.11AUserID" is a print setting (print setting item) for a "user ID" that is specified by the plug-in. In contrast, "RIUserID" is a "user ID" that is specified by the PPD.

Further, FIG. 12 illustrates the PPD in which the print settings are stored. FIG. 12 is a diagram illustrating a concrete example of the print settings of the PPD according to the embodiment. The PPD is a text file in which information unique to a printer is written. In the case of Mac OS X (registered trademark), a PPD corresponding to a print queue is generated in a directory of "/etc/cups/ppd". The print settings are stored in an associated PPD for each of print queues.

In the grammar of the PPD, a character string starting with an asterisk (*) is referred to as a keyword. The keyword may be defined in advance as PPD specifications, or may be freely defined by a printer vendor or a user under a predetermined rule. For example, "*PPD-Adobe" indicates a version of PPD specifications to which the PPD conforms. By specifying a value following the keyword after a colon, it is possible to associate the value with the keyword. By using this method, print settings are stored in the PPD. Meanwhile, rows starting with "*%" are ignored as comments.

The second row of "*RIUserIDString:userid" in FIG. 12 is an example in which a print setting is stored in the PPD. "*RIUserIDString" is a keyword indicating a user ID, and "userid" is a value that is specified as the user ID.

The drivers are able to read and write the value of each of the print settings from the PPD via the keyword.

Operation in which Printer Driver of Client PC is not Used

Figure 13:
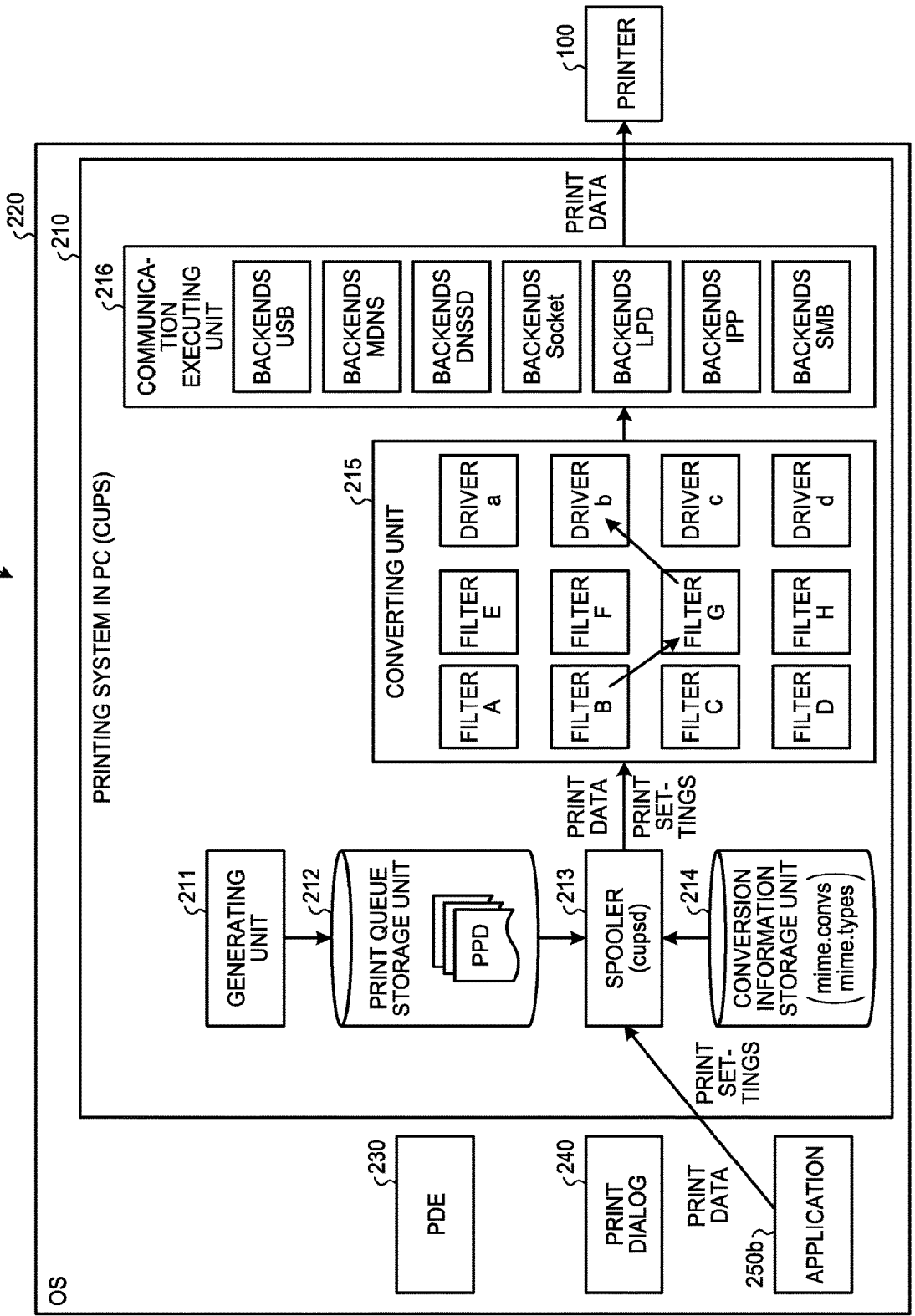
FIG. 13 is a diagram illustrating another example of the functional configuration and the operation of the client PC according to the embodiment.
Figure 14:
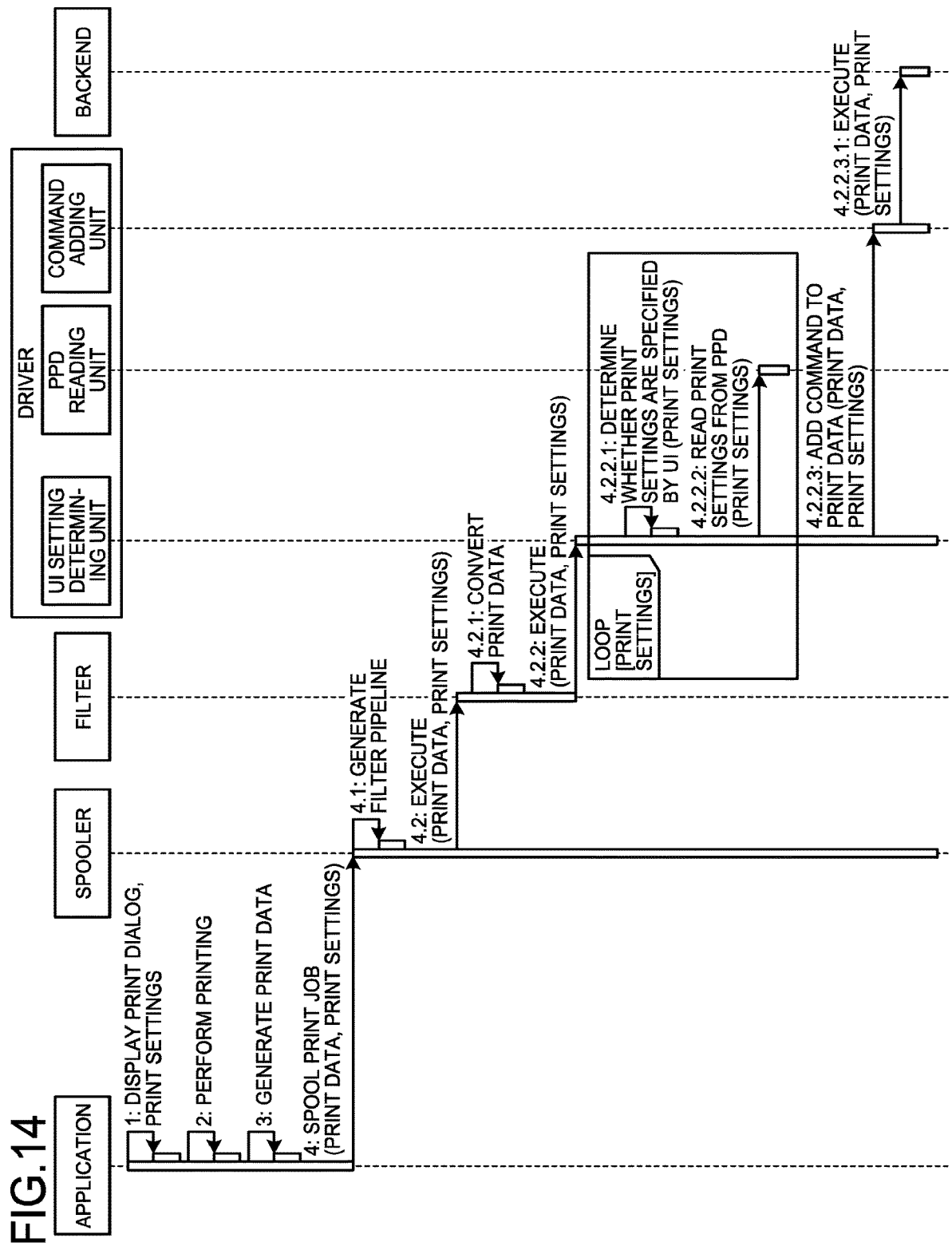
FIG. 14 is a sequence diagram illustrating an example of print operation in which the printer driver of the client PC according to the embodiment is not used.

Operation in which the printer driver of the client PC 200 according to the embodiment is not used will be described below with reference to FIG. 13 and FIG. 14. FIG. 13 is a diagram illustrating another example of the functional configuration and the operation of the client PC 200 according to the embodiment. FIG. 14 is a sequence diagram illustrating an example of print operation in which the printer driver of the client PC 200 according to the embodiment is not used.

The application 250*b* serving as the data generating unit illustrated in FIG. 13 is an application that does not use the printer driver. When the application 250*b* performs printing, the application 250*b* itself directly transmits print settings and print data to the spooler 213 without calling the print dialog 240 (1 to 4 in FIG. 14). In this case, because the print dialog 240 is not called, functions of the printer driver displayed by the plug-in of the print dialog 240 are not available. In other words, the print settings transmitted from the application 250*b* to the spooler 213 do not include setting values, such as a user ID and a password. Meanwhile, in some cases, the application 250*b* itself may display a screen for performing print settings, instead of calling the print dialog 240.

The spooler 213 generates a filter pipeline (4.1 to 4.2 in FIG. 14). A file format of the print data is converted using a filter of the converting unit 215 (4.2.1 to 4.2.2 in FIG. 14). Further, a driver converts the print data to a unique print data format.

The UI setting determining unit D2 of the driver determines whether print settings, such as a user ID and a password, are specified by the user interface (4.2.2.1 in FIG. 14). If the print settings do not include the setting values, in the application 250*b* that performs printing without using the printer driver, the PPD reading unit D3 reads the print settings including the user ID and the password from the PPD (4.2.2.2 in FIG. 14). If the print settings include the setting values, the PPD writing unit D1 stores the print settings in the PPD. The command adding unit D4 adds a command to the print data (4.2.2.3 in FIG. 14). The driver repeats the sequence for all of the print settings.

Thereafter, the print data is transmitted to and printed by the printer 100 by the backends included in the communication executing unit 216 (4.2.2.3.1 in FIG. 14).

Printing Process performed by Client PC

Figure 15:
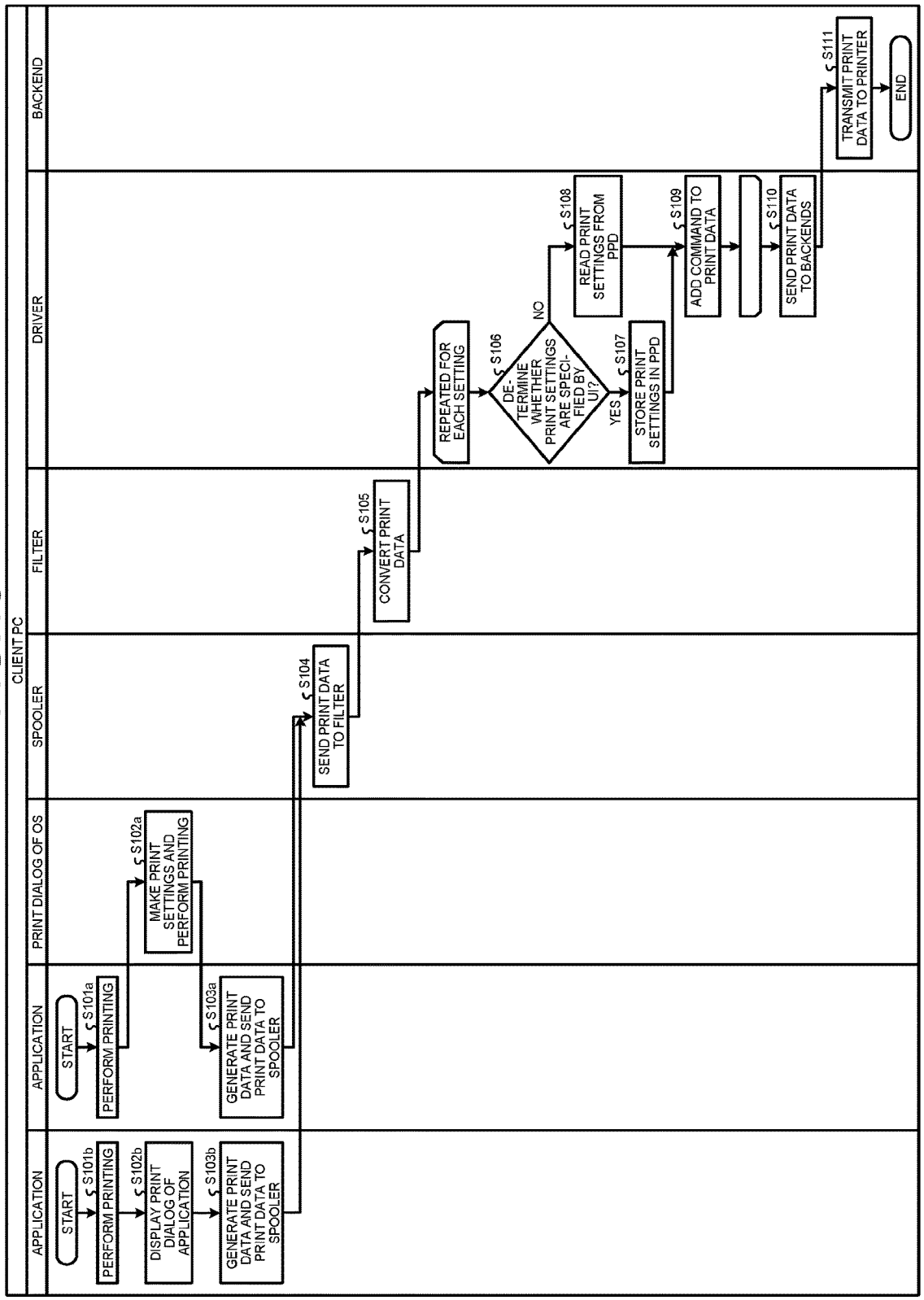
FIG. 15 is a flow diagram illustrating an example of the flow of a printing process performed by the client PC according to the embodiment.

An example of the printing process performed by the client PC 200 of the embodiment will be described below with reference to FIG. 15. FIG. 15 is a flow diagram illustrating an example of the flow of the printing process performed by the client PC 200 according to the embodiment.

First, a printing process performed via the application 250*a* will be described.

As illustrated in FIG. 15, when the application 250*a* performs printing at Step S101*a*, print settings including a user ID and a password are made from the print dialog 240 at Step S102*a*. At Step S103*a*, the application 250*a* generates print data and sends the generated print data to the spooler 213.

At Step S104, the spooler 213 sends the print data received from the application 250*a* to a filter. At Step S105, the filter converts a format of the print data.

At Step S106, the UI setting determining unit D2 of the driver determines whether the print settings are specified by the user interface. In this case, the printing is performed via the application 250*a* (Yes), and therefore, at Step S107, the PPD writing unit D1 stores the print settings in the PPD. At Step S109, the command adding unit D4 adds a command to the print data. The driver repeats the processes from Step S106 to Step S109 for all of the print settings.

At Step S110, the driver sends the print data to the backends.

At Step S111, the backends transmits the print data to the printer 100. Thus, the printing process via the application 250*a* is completed.

Next, a printing process performed via the application 250*b* will be described.

As illustrated in FIG. 15, when the application 250*b* performs printing at Step S101*b*, a print dialog provided by the application 250*b* for example is displayed and print settings are made at Step S102*b*. The print settings do not include settings of a user ID and a password. At Step S103*b*, the application 250*b* generates print data and sends the generated print data to the spooler 213.

At Step S104, the spooler 213 sends the print data received from the application 250*b* to a filter. At Step S105, the filter converts a format of the print data.

At Step S106, the UI setting determining unit D2 of the driver determines whether the print settings are specified by the user interface. In this case, the printing is performed via the application 250*b*, and the print settings are not made in some cases (No), and therefore, at Step S108, the PPD reading unit D3 reads the print settings from the PPD. At Step S109, the command adding unit D4 adds a command to the print data. The driver repeats the processes from Step S106 to Step S109 for all of the print settings.

At Step S110, the driver sends the print data to the backends.

At Step S111, the backends transmits the print data to the printer 100. Thus, the printing process via the application 250*b* is completed.

For example, in the information processing apparatus described in Japanese Laid-open Patent Publication No. 2015-111376, when a user ID and a password are set by a printer driver, the user ID and the password are stored in a PPD in association with information on a login user. In a second and later printing, if the login user performs printing, the printer driver reads and sets the user ID and the password stored as above, to thereby allow the user to omit settings in each printing. However, when printing is performed via an application that does not use the printer driver, the printer driver is not called and it is impossible to read the user ID and the password stored as above.

In the client PC 200 of the embodiment, the driver determines whether print settings are made by the user interface, and even when the print settings are not made by the user interface, the drive reads print settings from the PPD and reflects the print settings in current print settings. Therefore, even when printing is performed via an application that does not use a printer driver, it is possible to perform user authentication. Consequently, it is possible to allow a user to use a user authentication function more broadly and easily.

Modification

In the embodiment as described above, the UI setting determining unit D2 of the driver determines presence or absence of print settings. A client PC of a modification of the embodiment is different from the embodiment as described above in that whether to the read print settings from the PPD is determined based on whether a flag is on in the PPD.

Figure 16:
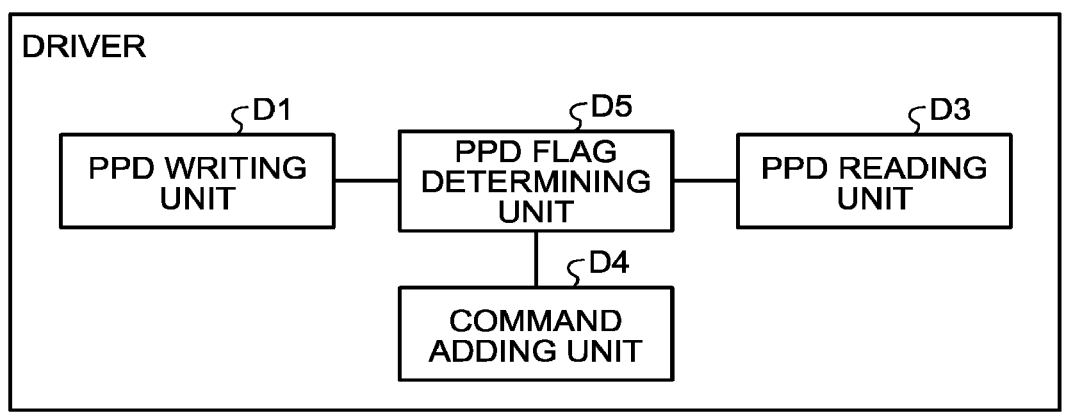
FIG. 16 is a diagram illustrating an example of a functional configuration of a driver according to a modification of the embodiment.

The client PC of the modification of the embodiment is configured such that a flag is turned on when printing is performed via the application 250*b* that does not use a printer driver. Further, as illustrated in FIG. 16, a driver of the modification of the embodiment includes, for example, a PPD flag determining unit D5 serving as a flag determining unit, instead of the UI setting determining unit D2 or in addition to the UI setting determining unit D2.

Figure 17:
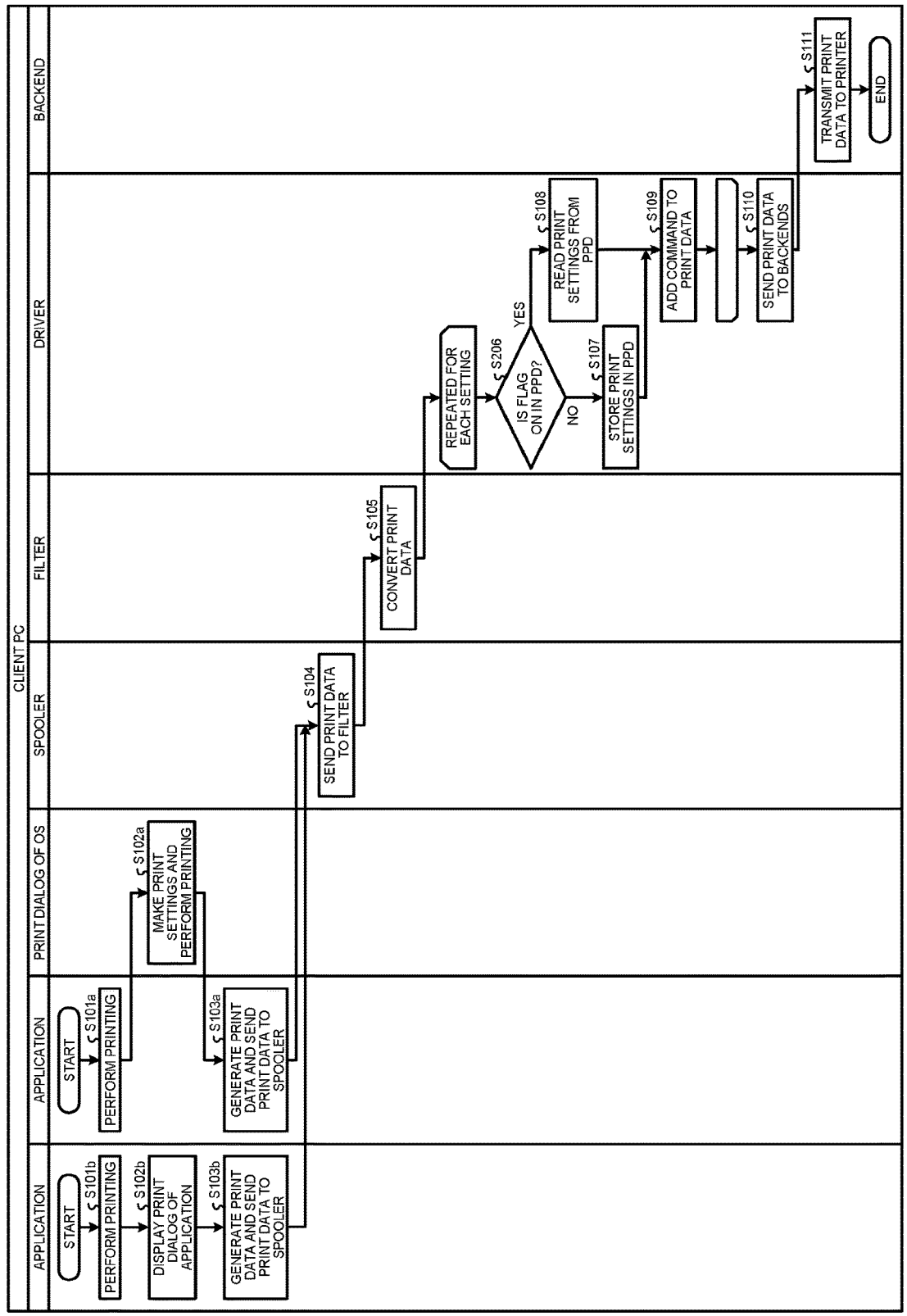
FIG. 17 is a flow diagram illustrating an example of the flow of a printing process performed by a client PC according to the modification of the embodiment.

At Step S206 in FIG. 17, the PPD flag determining unit D5 determines whether a flag is on in the PPD. If the flag is off in the PPD (No), it is determined that the printing is performed via the application 250a that uses the printer driver, and print settings are made by the user interface. Then, the PPD writing unit D1 stores the settings in the PPD.

If the flag is on in the PPD (Yes), it is determined that the printing is performed via the application 250b that does not use a printer driver, and print settings are not made by the user interface. Then, the PPD reading unit D3 reads the print settings from the PPD.

In the client PC of the modification of the embodiment, it is possible to use a user authentication function using a driver as, for example, undocumented feature.

Other Embodiments

While the printer 100 is described as the image forming apparatus in the above-described embodiment, embodiments are not limited to this example. For example, the image forming apparatus may be a copier, a scanner, a facsimile machine, or a multifunction peripheral (MFP) that includes at least two of a printing function, a copying function, a scanner function, and a facsimile function.

In the above-described embodiment, setting values related to user authentication are mainly described as an example of print settings that are available when the printer driver is not used; however, embodiments are not limited to this example. The settings that are available when a driver, such as a printer driver, is not used and that are made for forming an image (for outputting an image) include various settings that may be used in the image forming apparatus, such as the printer 100.

A program executed by a computer of the embodiment is provided by being incorporated in a ROM or the like in advance. Further, the program may be provided by being recorded in a computer readable recording medium, such as a compact disc-ROM (CD-ROM), a flexible disk (FD), a compact disc-recordable (CD-R), or a digital versatile disk (DVD), in a computer-installable or computer-executable file format.

Furthermore, the program executed in the embodiment may be stored in a computer that is connected to a network, such as the Internet, and may be provided by being downloaded via the network. Moreover, the program executed in the embodiment may be provided or distributed via a network, such as the Internet.

According to the present invention, even when printing is performed via an application that does not use a printer driver, it is possible to use same print settings as in the case of using the printer driver.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus configured to perform communication with an apparatus connected via a network, the information processing apparatus comprising:
a print setting information memory to store a print setting in association with a setting value; and
circuitry configured to
first allow, by a print dialog program component, a setting value for a particular print setting to be specified;
second allow, by a print dialog extension program component, different from the print dialog program component, the setting value for the particular print setting to be specified;
specify a particular setting value for the particular print setting through one of the first allowing or the second allowing;
generate print data;
determine whether the particular setting value for the print setting is specified through the first allowing by the print dialog program component or through the second allowing by the print dialog extension program component;
write the particular print setting and the particular setting value specified through one of the first allowing and the second allowing in the print setting information memory in an associated manner;
read the particular setting value associated with the particular print setting from the print setting information memory; and transmit, to the apparatus, the print data to which a print command corresponding to the particular print setting including the particular setting value is added.

2. The information processing apparatus according to claim 1, wherein the circuitry is further configured to determine whether a flag is on in the print setting information memory, the flag indicating that printing is performed without specifying the particular setting value for the particular print setting, at the writing, write the particular print setting and the particular setting value in the print setting information memory in an associated manner when the flag is off in the print setting information memory, and at the reading, read the particular setting value associated with the particular print setting from the print setting information memory when the flag is on in the print setting information memory.

3. The information processing apparatus according to claim 1, wherein the particular setting value is a value for user authentication.

4. A printing method implemented by an information processing apparatus configured to perform communication with an apparatus connected via a network, the printing method comprising:

first allowing, by a print dialog program component, a setting value for a particular print setting to be specified;

second allowing, by a print dialog extension program component, different from the print dialog program component, the setting value for the particular print setting to be specified;

specifying a particular setting value for the particular print setting through one of the first allowing or the second allowing;

determining whether the particular setting value for the particular print setting is specified through the first allowing by the print dialog program component or through the second allowing by the print dialog extension program component, in response to print data being generated;

writing the particular print setting and the particular setting value specified through one of the first allowing and the second allowing in a print setting information memory in an associated manner, when the particular setting value is specified for the particular print setting; and reading the particular setting value associated with the particular print setting from the print setting information memory, when the particular setting value is not specified for the particular print setting.

5. The printing method according to claim 4, further comprising determining whether a flag is on in the print setting information memory, the flag indicating that printing is performed without specifying the particular setting value for the particular print setting, wherein the writing step comprises writing the particular print setting and the particular setting value in the print setting information memory in an associated manner when the flag is off in the print setting information memory, and the reading step comprises reading the particular setting value associated with the particular print setting from the print setting information memory when the flag is on in the print setting information memory.

6. The printing method according to claim 4, wherein the particular setting value is a value for user authentication.

7. A non-transitory computer-readable medium including programmed instructions that cause a computer to execute a method comprising:

first allowing, by a print dialog program component, a setting value for a particular print setting to be specified;

second allowing, by a print dialog extension program component, different from the print dialog program component, the setting value for the particular print setting to be specified;

specifying a particular setting value for the particular print setting through one of the first allowing or the second allowing;

determining whether the particular setting value for the particular print setting is specified through the first allowing by the print dialog program component or through the second allowing by the print dialog extension program component in response to print data being generated;

writing the particular print setting and the particular setting value specified through one of the first allowing and the second allowing in a print setting information memory in an associated manner, when the particular setting value is specified for the particular print setting; and reading the particular setting value associated with the particular print setting from the print setting information memory, when the particular setting value is not specified for the particular print setting.

8. The non-transitory computer-readable medium according to claim 7, wherein the programmed instructions cause the computer to further execute determining whether a flag is on in the print setting information memory, the flag indicating that printing is performed without specifying the particular setting value for the particular print setting, wherein the programmed instructions cause the computer to execute:

in the writing step, writing the particular print setting and the particular setting value in the print setting information memory in an associated manner when the flag is off in the print setting information memory, and in the reading, reading the particular setting value associated with the particular print setting from the particular print setting information memory when the flag is on in the print setting information memory.

9. The non-transitory computer-readable medium according to claim 7, wherein the particular setting value is a value for user authentication.

\* \* \* \* \*